US008192172B2

(12) United States Patent
Baker et al.

(10) Patent No.: US 8,192,172 B2
(45) Date of Patent: Jun. 5, 2012

(54) FLOW SENSING SHUTOFF VALVE

(75) Inventors: Carthel C. Baker, Oregon, IL (US); Terence J. Voskuil, Pecatonica, IL (US)

(73) Assignee: Woodward, Inc., Fort Collins, CO (US)

( * ) Notice: Subject to any disclaimer, the term of this patent is extended or adjusted under 35 U.S.C. 154(b) by 552 days.

(21) Appl. No.: 12/418,931

(22) Filed: Apr. 6, 2009

(65) Prior Publication Data

US 2010/0251814 A1 Oct. 7, 2010

(51) Int. Cl.
*G01F 5/00* (2006.01)
*F16K 37/00* (2006.01)

(52) U.S. Cl. .......................................... 417/43; 137/554

(58) Field of Classification Search .................. 417/302, 417/213, 304, 308, 310, 43, 44.2, 212, 279, 417/300, 307, 440; 137/115.13, 554; 60/40, 60/734, 39.281, 773
See application file for complete search history.

(56) References Cited

U.S. PATENT DOCUMENTS

| | | |
|---|---|---|
| 4,892,114 A | 1/1990 | Maroney et al. |
| 5,490,379 A | 2/1996 | Wernberg et al. |
| 5,711,145 A | 1/1998 | Perkey |
| 6,102,001 A | 8/2000 | McLevige |
| 6,786,702 B2 | 9/2004 | Zagranski et al. |
| 6,821,093 B2 | 11/2004 | Zagranski et al. |
| 7,007,452 B1 | 3/2006 | Baryshnikov et al. |
| 7,178,510 B2 | 2/2007 | Askew et al. |
| 2006/0032535 A1* | 2/2006 | Madden ....................... 137/554 |

FOREIGN PATENT DOCUMENTS

| | | |
|---|---|---|
| JP | 2001-021059 A | 1/2001 |
| JP | 2001-055132 A | 2/2001 |
| JP | 2003-156170 A | 5/2003 |

\* cited by examiner

*Primary Examiner* — Anh Mai
*Assistant Examiner* — Elmito Breval
(74) *Attorney, Agent, or Firm* — Reinhart Boerner Van Deuren P.C.

(57) ABSTRACT

A flow sensing valve includes a valve housing having an inlet port, an outlet port, and a plurality of flow sensing ports. A valve member, located within the valve housing, is configured to move between an open position and a closed position. The valve member allows fuel flow between the inlet port and outlet port in the open position, and blocks fuel flow between the inlet port and the outlet port in the closed position. A position sensor, operably coupled to the valve member, is configured to determine a valve position of the flow sensing valve. The valve position is indicative of a valve open port area. A metered flow rate of pressurized fuel through the flow sensing valve in a upstream manifold is proportional to the valve open port area because the flow sensing valve maintains a nearly constant differential pressure across the inlet and outlet ports.

24 Claims, 6 Drawing Sheets

FLOW SENSING SHUTOFF VALVE

FIELD OF THE INVENTION

This invention generally relates to a flow sensing valve and, more particularly, to a flow sensing valve for determining a metered flow rate of pressurized fuel to an engine.

BACKGROUND OF THE INVENTION

Traditionally, open loop variable flow source systems that attempt to meter flow directly through varying the output of the variable flow source do not provide sufficient flow rate accuracy for most applications. Typically, to provide the required accuracy, a closed loop system that controls the output of the variable flow source based on metered flow rate is required. The closed loop system typically includes a fuel metering valve located downstream of the variable flow source. The fuel metering valve is selectively positioned to restrict fuel flow in the downstream manifold to provide a metered flow rate of pressurized fuel to the combustion chamber of an engine. With such a fuel metering system, a separate pressure regulation system may be used to maintain a substantially constant differential pressure across the fuel metering valve. Moreover, the fuel metering system may include a separate shutoff valve to block fuel flow to the engine combustion chamber during a shutoff operation.

By reducing the number of components in the fuel metering system, the cost and weight of the system may be substantially reduced and system reliability may be substantially increased. In addition, a system capable of measuring the flow rate of pressurized fuel provided to the engine combustion chamber and providing this as closed loop feedback to a controller that controls the output of the variable flow source, allows for precise control of the metered flow rate.

BRIEF SUMMARY OF THE INVENTION

In one embodiment, a flow sensing valve includes a valve housing including an inlet port, an outlet port, and a plurality of flow sensing ports. The inlet port and the outlet port are in fluid communication with a flow of pressurized fuel in an upstream manifold. The flow sensing valve further includes a valve member located within the valve housing. The valve member is configured to move between an open position and a closed position. The valve member allows fuel flow between the inlet port and the outlet port in the open position, and blocks fuel flow between the inlet port and the outlet port in the closed position. A position sensor is operably coupled to the valve member and is configured to determine a valve position of the flow sensing valve. The valve position is indicative of a valve open port area. A metered flow rate of pressurized fuel through the flow sensing valve in the downstream manifold is proportional to the valve open port area.

In another embodiment, a fuel metering system includes a variable flow source configured to pressurize fuel from a supply manifold, and to provide a flow of pressurized fuel to an upstream manifold. A flow sensing valve is operably coupled to the variable flow source and includes a valve housing having an inlet port, an outlet port, and a plurality of flow sensing ports. The flow sensing valve also includes a valve member located within the valve housing. The valve member is configured to move between an open position to allow fuel flow between the inlet port and the outlet port, and a closed position to block fuel flow between the inlet port and the outlet port. A position sensor is operably coupled to the valve member and is configured to determine a valve position of the flow sensing valve. The valve position is indicative of a valve open port area of the flow sensing valve. A controller is operably coupled to the variable flow source and the position sensor. The controller is configured to determine a metered flow rate of pressurized fuel through the flow sensing valve based on the valve position. The controller is further configured to operate the variable flow source based on the metered flow rate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
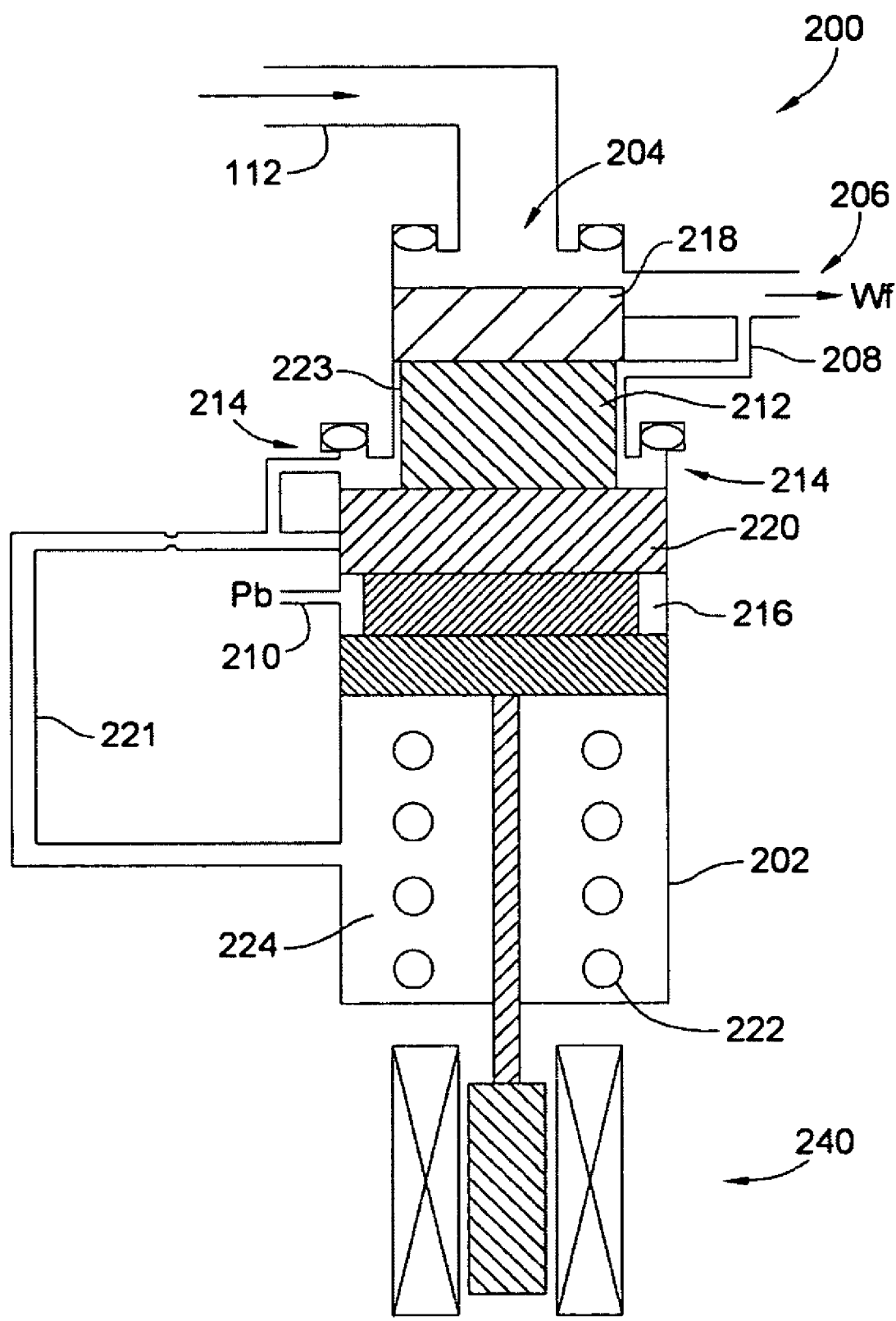
FIG. 1 is a schematic illustration of a flow sensing valve that includes a fuel feedback path according to an embodiment of the invention.

FIG. 1 illustrates a flow sensing valve 200 according to an embodiment of the invention. The flow sensing valve 200 includes a valve housing 202 having an inlet port 204, an outlet port 206, and a plurality of flow sensing ports 208-210. A valve operator or valve member 212 is located within the valve housing 202. The valve member 212 is configured to move linearly along an axis in a particular direction (e.g., a vertical direction) between an open position and a closed position. The position of the valve member 212 is based on fuel flow through the flow sensing valve 200 from the upstream manifold 112. The valve member 212 allows fuel flow between the inlet port 204 and the outlet port 206 in the open position, and blocks fuel flow between the inlet port 204 and the outlet port 206 in the closed position.

The flow sensing valve 200 also includes a spring element 222 located within a spring chamber 224 defined by the valve housing 202. The spring element 222 biases the flow sensing valve 200 against the fuel flow in the upstream manifold 112. A position sensor 240 is operably coupled to the valve member 212. The position sensor 240 is configured to determine a valve position of the valve member 212. The valve member position is indicative of an open port area of the inlet and outlet ports 204-206. The position sensor 240 may be operably coupled to a controller 304 (shown in FIG. 4) to provide valve position feedback information to the controller 304. In one embodiment, the position sensor 240 is a linear variable displacement transducer (LVDT). It is to be understood, however, that the position sensor 240 may include any type of sensor or transducer capable of sensing the linear displacement of the valve member 212.

Figure 4:
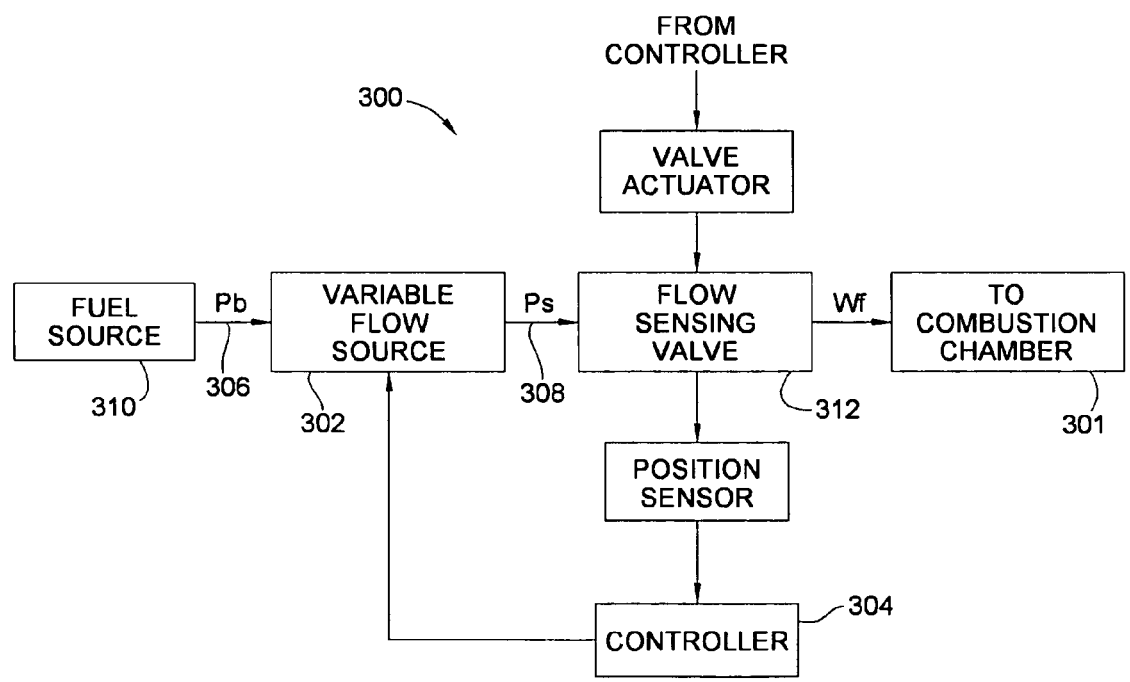
FIG. 4 is a block diagram of a fuel metering system that incorporates an embodiment of the invention.

When the flow sensing valve 200 is in the open position, pressurized fuel in the upstream manifold 112 is communicated to the engine combustion chamber at the metered flow rate (Wf), which may be set by regulating a variable flow source 302 (shown in FIG. 4). As a result, the pressure downstream of the outlet port 206 is communicated to the flow sensing port 208, to a first valve chamber 214, and to a fuel feedback path 221. The fuel feedback path 221 connects the first valve chamber 214 and the spring chamber 224. The combined force of the flow of pressurized fuel in the spring chamber 224 and the spring force of the spring element 222 in the spring chamber 224 act to urge the valve member 212 toward the closed position to block fuel flow between the inlet and outlet ports 204, 206. When the combined flow and spring forces in the spring chamber 224 are greater than the force of the pressurized fuel flow from the upstream manifold 112, the flow sensing valve 200 closes. In the closed position, the flow sensing valve 200 may be configured to provide a substantially zero leak seal.

In operation, pressure at the inlet port 204 of the flow sensing valve 200 is higher than pressure at the outlet port 206. When the force resulting from the pressure at the inlet port 204 is greater than the combined force of the spring plus the force resulting from the pressure at the outlet port 206, the valve member 212 moves to, or remains in, the open position. Conversely, when the inlet pressure drops such that the force at the inlet port 204 is less than the combined spring force and outlet pressure force, the valve member 212 moves to the closed position.

Figure 2:
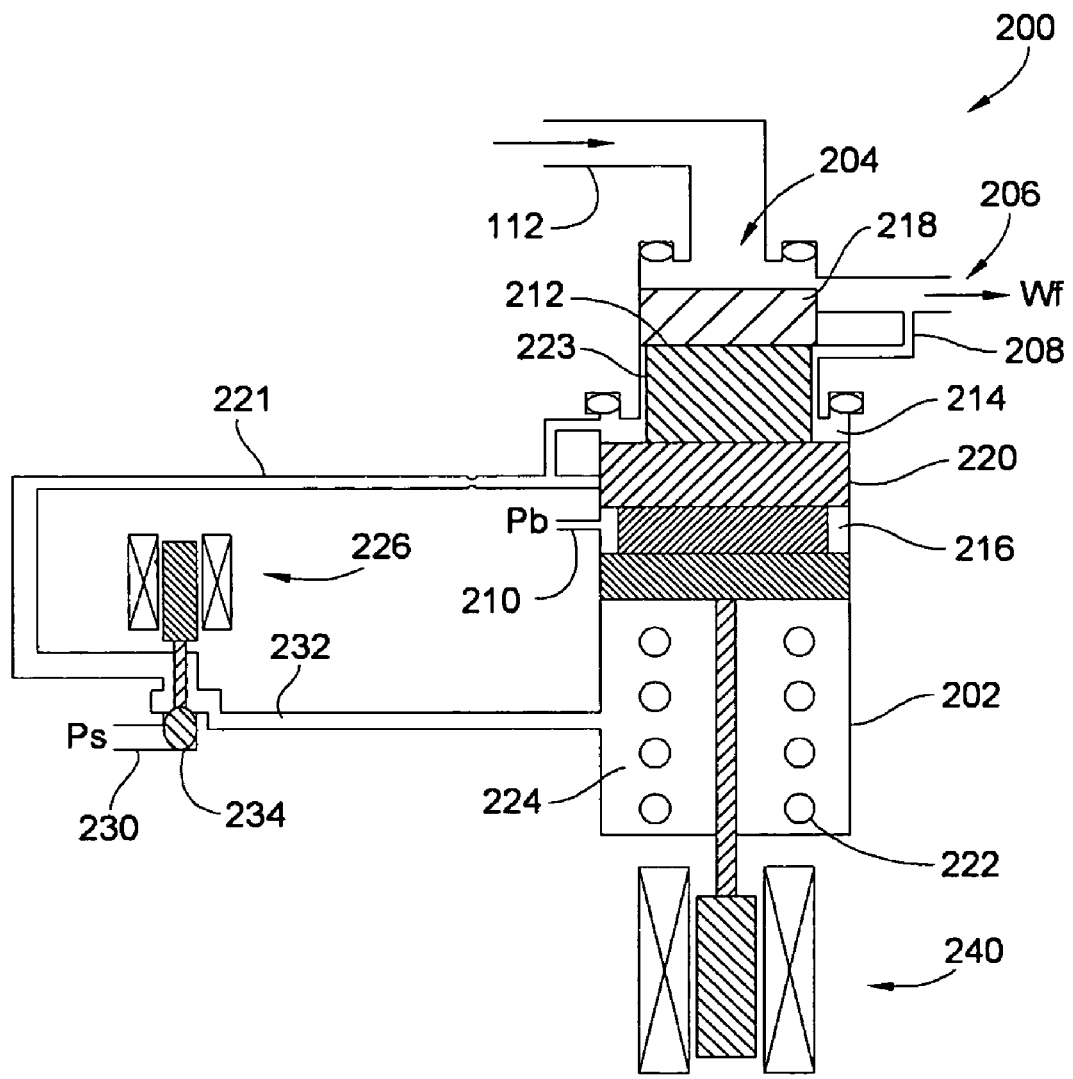
FIG. 2 is a schematic illustration of a flow sensing valve that includes a flow sensing shutoff valve according to an embodiment of the invention.

FIG. 2 illustrates the flow sensing valve 200 according to an embodiment of the invention. The flow sensing valve 200 includes the valve housing 202, inlet port 204, outlet port 206, the plurality of flow sensing ports 208-210 and the valve member 212. As in the previous embodiment, the valve member 212 is configured to move linearly along an axis between the open position and closed position. As in the previous embodiment, the valve member position is based on fuel flow from the upstream manifold 112. In the open position, the valve member 212 allows fuel flow between the inlet port 204 and outlet port 206, while in the closed position, the valve member 212 blocks fuel flow between the inlet and outlet ports 204, 206. The spring element 222 in the spring chamber 224 biases the flow sensing valve 200 against the fuel flow in the upstream manifold 112.

The embodiment of FIG. 2 also includes a valve actuator 226 operably coupled to the valve housing 202 and configured to control movement of the valve member 212 between the open position and the closed position based on the fuel flow from the upstream manifold 112. The valve actuator 226 includes an actuator inlet 230, an actuator outlet 232, and an actuator member 234 configured to be removably positioned between the actuator inlet 230 and the actuator outlet 232. The actuator inlet 230 is in fluid communication with the flow of pressurized fuel at pressure (Ps) from the upstream manifold 112, and the actuator outlet 232 is in fluid communication with the spring chamber 224.

The actuator member 234 is configured to move axially in a particular direction (e.g., a vertical direction) between an open actuator position and a closed actuator position. Specifically, when the actuator member 234 is in the open actuator position, pressurized fuel at pressure (Ps) flows from the actuator inlet 230 through the actuator outlet 232 and to the spring chamber 224. As a result, the combined force of the flow of pressurized fuel at pressure (Ps) in the spring chamber 224 and the spring force of the spring element 222 in the spring chamber 224 act to urge the valve member 212 toward the closed position to block fuel flow between the inlet port 204 and the outlet port 206. The flow sensing valve 200 may be configured to provide substantially zero leakage of fuel to the engine combustion chamber in the closed position. On the other hand, when the actuator member 234 is in the closed actuator position, the flow of pressurized fuel between the actuator inlet 230 and the actuator outlet 232 is blocked.

In embodiments of the invention, the valve actuator 226 may include a solenoid valve or an electro-hydraulic servo valve, both of which can be electronically controlled by the controller 304 (shown in FIG. 4) to move the actuator member 234 between the open actuator position and the closed actuator position. Specifically, movement of the valve actuator 226 between the open actuator position and the closed actuator position is based on movement of the actuator member 234 (e.g., a spherical ball configured to move into or out of abutment with a valve seat).

Still referring to FIG. 2, the valve member 212 is shown in the open position. When the actuator member 234 is in the closed actuator position, the flow of pressurized fuel at pressure (Ps) is blocked between the actuator inlet 230 and the actuator outlet 232. As a result, the valve member 212 is axially moved toward the open position. When the flow sensing valve 200 is in the open position, pressurized fuel in the upstream manifold 112 is communicated to the engine combustion chamber at the metered flow rate (Wf), which may be set by regulating a variable flow source 302 (shown in FIG. 4). As a result, the pressure downstream of the outlet port 206 is communicated to the flow sensing port 208, to a first valve chamber 214, and to the fuel feedback path 221.

The plurality of flow sensing ports 208-210 includes a first flow sensing port 208 and a second flow sensing port 210. The first flow sensing port 208 is in fluid communication with the first valve chamber 214, and the second flow sensing port 210 is in fluid communication with a second valve chamber 216. The first flow sensing port 208 is configured to communicate the pressure downstream of the outlet port 206 to the first valve chamber 214, and the second flow sensing port 210 is configured to drain fuel flow from the second valve chamber 216. Drain pressure (Pb) is initially supplied as the reference pressure to the flow sensing valve 200. As the flow sensing valve 200 slews open, the second flow sensing port 210 is closed and the pressure at the first flow sensing port 208 is supplied through the flow sensing valve 200 to become the reference pressure for the flow sensing valve 200.

The flow sensing valve 200 is configured to maintain a nearly constant differential pressure across the inlet and outlet ports 204-206. A force balance that includes the downstream pressure acting on the spring side of the valve member 212 and the upstream pressure acting on the inlet side of the valve member 212 allows the pressure drop from upstream to downstream to be set mainly by the force of the spring 222. The result is a nearly constant pressure drop across valve ports 204, 206 that is not significantly affected by upstream operating conditions or by downstream restrictions. As such, a separate pressure regulation system to maintain a substantially constant pressure differential across the flow sensing valve 200 is not required.

In one embodiment, the valve member 212 includes a valve spool 212 having a generally cylindrical configuration. The valve spool 212 includes a plurality of spool lands 218-220 to control the flow of pressurized fuel between the various ports 204-210 of the flow sensing valve 200. Although the valve member 212 is described as a valve spool 212 having a generally cylindrical configuration in one embodiment, it is to be understood that the valve member 212 may include other types and configurations of valve operators or members such as, for example, a valve poppet, if desired.

The plurality of spool lands 218-220 includes a first spool land 218 and a second spool land 220. A spacer 223 is coupled to each of the first spool land 218 and the second spool land 220. As shown, the spacer 223 may have a smaller diameter than both the first spool land 218 and the second spool land 220, thereby defining the size of the first valve chamber 214 and the second valve chamber 216, respectively.

The axial position of the valve member 212 controls the position of the plurality of spool lands 218-220 and, therefore, the degrees to which the inlet and outlet ports 204-206 of the flow sensing valve 200 are opened, i.e., the valve open port area. Specifically, axial movement of the valve member 212 toward the closed position, causes the first spool land 218 to move to a position to block fuel flow between the inlet port 204 and the outlet port 206, and causes the second spool land 220 to move to a position to block fuel flow from the first valve chamber 214 to the fuel feedback path 221. On the other hand, axial movement of the valve member 212 toward the open position, causes the first spool land 218 to move to a position to allow fuel flow between the inlet port 204 and the outlet port 206, and causes the second spool land 220 to move to a position to allow fuel flow from the first flow sensing port 208 to the first valve chamber 214 and to the fuel feedback path 221. The degrees to which the inlet and outlet ports 204-206 are opened (i.e., the valve open port area) is controlled by axial movement of the valve member 212, which is based on the metered flow rate (Wf) of pressurized fuel flowing through the flow sensing valve 200 to the engine combustion chamber.

Figure 3:
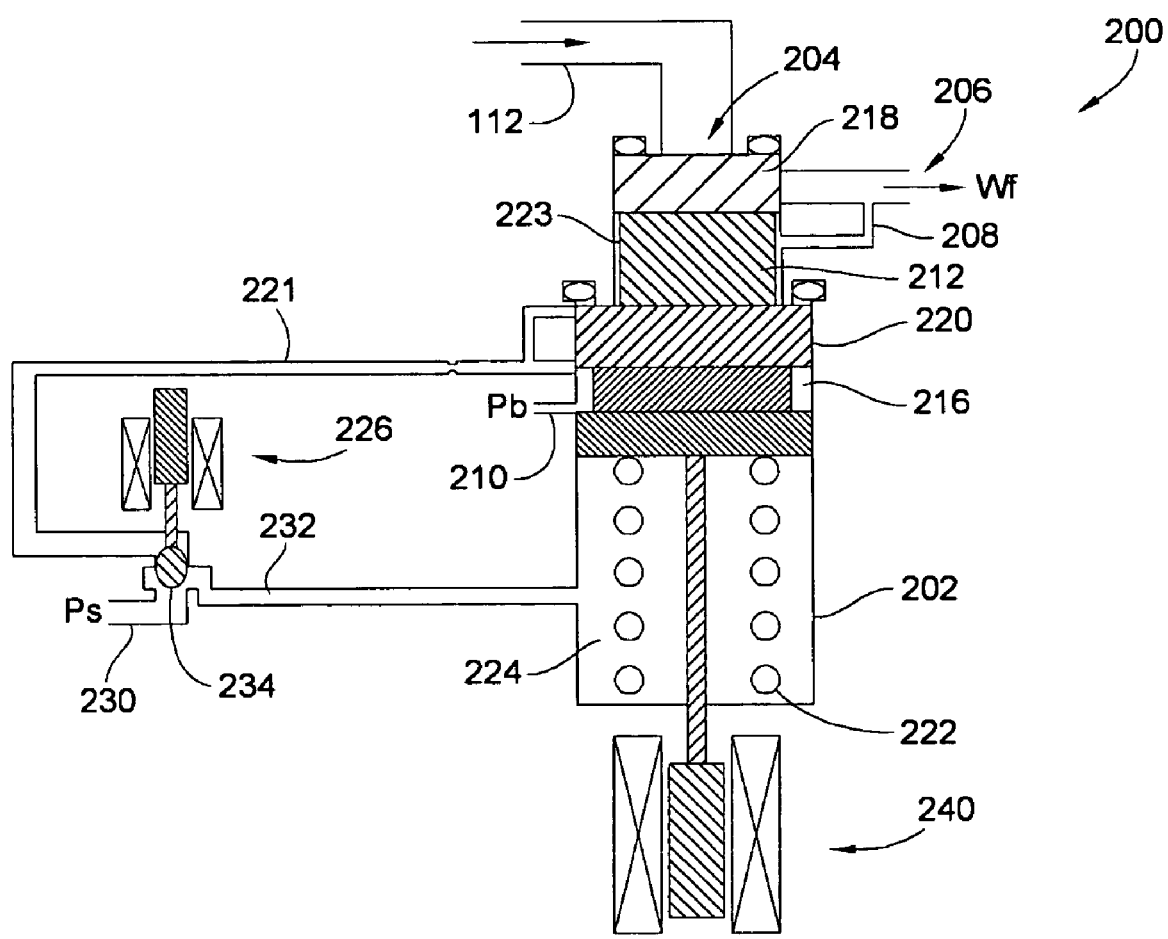
FIG. 3 is a schematic illustration of a flow sensing valve that includes a flow sensing shutoff valve according to an embodiment of the invention.

Referring to FIG. 3, the flow sensing valve 200 is shown in the closed position. During a shutoff operation, the valve member 212 moves from the open position toward the closed position to provide substantially zero leakage between the inlet port 204 and the outlet port 206. In addition, the flow sensing valve 200 may include a plurality of seals to provide additional protection against fuel leakage to the combustion chamber during a shutoff operation. As a result, engine performance may be enhanced and fuel emissions may be lowered due to the decreased risk of unburned fuel and hydrocarbons being present in the combustion chamber.

As shown in FIG. 3, when the actuator member 234 of the valve actuator 226 is in the open actuator position, pressurized fuel at pressure (Ps) from the upstream manifold 112 flows between the actuator inlet 230 and the actuator outlet 232 and to the spring chamber 224. As a result of the force of the spring element 222, and the force of the flow of pressurized fuel (Ps) in the spring chamber 224, the valve member 212 moves to the closed position to block fuel flow between the inlet port 204 and the outlet port 206.

FIG. 4 is a block diagram showing a fuel metering system 300 that incorporates an embodiment of the invention. The fuel metering system 300 is used to regulate a flow of fuel to a combustion chamber 301 of a gas turbine engine. It is to be understood, however, that the fuel metering system 300 may be used with different types of engines and applications. As shown, the fuel metering system 300 includes a variable flow source 302 controlled by a controller 304. The variable flow source 302 is configured to pressurize fuel from a supply manifold 306, and to supply a flow of pressurized fuel to an upstream manifold 308 at a relatively constant pressure. Specifically, the variable flow source 302 draws fuel at a relatively low-pressure (Pb) from a fuel source 310 (e.g., a fuel tank and/or a boost pump) in the supply manifold 306. The variable flow source 302 supplies a flow of pressurized fuel at a relatively higher pressure (Ps) from the upstream manifold 308 to the combustion chamber 301 via a flow sensing valve 312.

Figure 5:
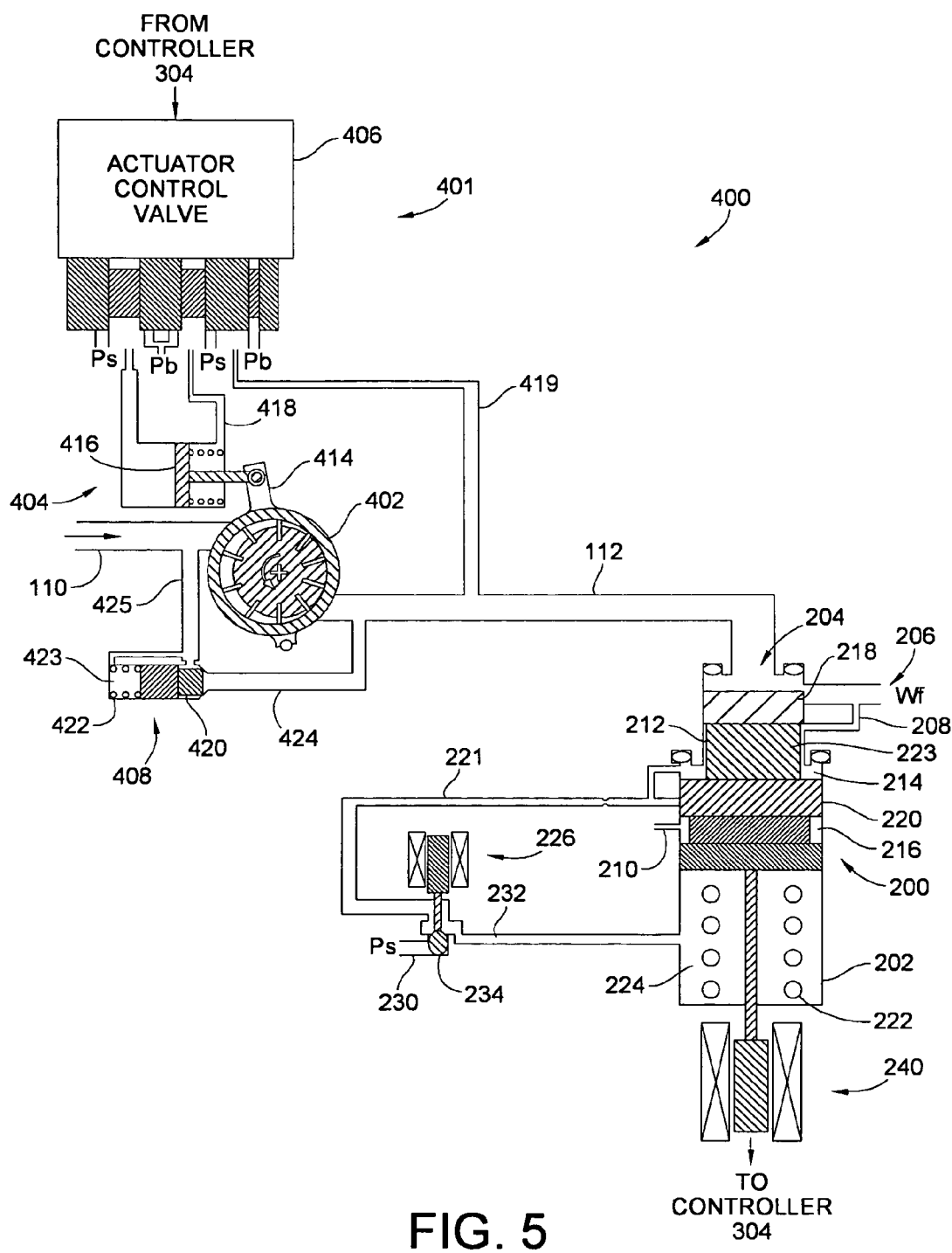
FIG. 5 is a schematic illustration of a fuel metering system that incorporates an embodiment of the invention.

FIG. 5 is a schematic diagram illustrating a fuel metering system 400 which incorporates an embodiment of the invention. In system 400, the variable flow source 401 includes a fuel pump 402, a pump actuator 404, and an actuator control valve 406. In one embodiment, the fuel pump 402 may be a vane-type variable displacement pump in which pump displacement or the amount of fuel output per pump cycle can be varied during a pump operation. Alternatively, the fuel pump 402 may include a gear-type rotary pump, a radial piston pump, an axial piston pump, and the like. The pump actuator 404 is mechanically coupled to the fuel pump 402 by a crank lever arm 414 in one embodiment. The pump actuator 404 is configured to control the output flow of the fuel pump 402 to maintain a desired outlet pressure during a pump operation. In one embodiment, the pump actuator 404 is a selectively positioned servo actuator that includes a piston member 416 configured to move linearly along an axis in a particular direction such as, for example, a horizontal direction. Specifically, the piston member 416 controls pump displacement and, therefore, the output flow of pressurized fuel in the upstream manifold 112 based on hydraulic power supplied thereto.

The actuator control valve 406 is configured to control the pump actuator 404 and, therefore, to control pump displacement by providing hydraulic power (i.e., a flow of pressurized fuel) to the pump actuator 404 through output connections 418. In one embodiment, the actuator control valve 406 is an electro-hydraulic servo valve (EHSV) that is driven by a portion of the pressurized fuel at pressure (Ps) in the upstream manifold 112, which is supplied by an actuator supply path 419.

The controller 304 may include an electronic engine controller that is operably coupled to the actuator control valve 406 to control a pump operation of the fuel pump 402. Specifically, the controller 304 is configured to provide a control signal to the actuator control valve 406 to provide hydraulic power to the pump actuator 404 based on the control signal. The control signal from the controller 304 is indicative of the demanded or desired fuel flow rate of the fuel pump 402. In one embodiment, the demanded or desired fuel flow rate of the fuel pump 402 is provided to the controller 304 by an external device associated with the engine. In response to the control signal from the controller 304, the actuator control valve 406 (e.g., an electro-hydraulic servo valve) selectively positions the pump actuator 404 to cause the fuel pump 402 to supply the flow of pressurized fuel based on the demanded or desired fuel flow rate. As such, the metered flow rate (Wf) of pressurized fuel to the engine combustion chamber is set by controlling the output or pump displacement of the fuel pump 402, rather than by a separate, selectively positioned fuel metering valve that restricts fuel flow in the upstream manifold 112. In this manner, the fuel metering system 400 may be constructed with fewer components, thereby increasing system reliability. In addition, more precise metering may be achieved by regulating fuel flow to the engine combustion chamber through electronic control of pump displacement or output, instead of using a separate, selectively positioned fuel metering valve.

The fuel metering system 400 also includes a relief valve 408. The relief valve 408 is operably coupled to the fuel pump 402 and is configured to control the maximum pressure in the fuel metering system 400. In one embodiment, the relief valve 408 is a spool valve that includes a spool member 420, a biasing spring 422 located within a spring chamber 423, a relief valve inlet 424 in fluid communication with the upstream manifold 112 to receive a flow of pressurized fuel at pressure (Ps), and a bypass return outlet 425 in fluid communication with a supply manifold 110 to communicate the flow of pressurized fuel at the relatively high pressure (Ps) to the relatively low-pressure (Pb) fuel source 310 (shown in FIG. 4). A spring force of the biasing spring 422 biases or urges the spool member 420 toward the closed position to block the flow of pressurized fuel at pressure (Ps) from the upstream manifold 112 to the bypass return outlet 425 until a predetermined pressure differential exists across the relief valve 408.

Specifically, when the force of the flow of pressurized fuel at pressure (Ps) in the upstream manifold 112 exceeds the spring force of the biasing spring 422, the spool member 420 moves to an open position, thereby allowing a portion of the flow of pressurized fuel at pressure (Ps) from the upstream manifold 112 to flow from the relief valve inlet 424 through the bypass return outlet 425 and back to the fuel source 310 (shown in FIG. 4) in the supply manifold 110. Any fuel located within the spring chamber 423 is vented into the flow passage. As a result, the pressure (Ps) at the output side of the fuel pump 402 decreases, which reduces the pressure acting against the relief valve 408 at the relief valve inlet 424. In this manner, the relief valve 408 prevents over-pressurization of the fuel metering system 400 by recirculating a portion of the flow of pressurized fuel at the relatively high pressure (Ps) from the output of the fuel pump 402 in the upstream manifold 112 back to the fuel source 310 when the pressure exceeds a predetermined maximum level.

The flow sensing valve 200 is operably coupled to the fuel pump 402 and located in the upstream manifold 112. The flow sensing valve 200 is configured to provide a minimum pressure function during operation and substantially zero leakage during shutoff. Specifically, the flow sensing valve 200 is configured to sense the difference between the flow of pressurized fuel at the relatively high pressure (Ps) in the upstream manifold 112 and the relatively low pressure (Pb) fuel from the fuel source 310 (shown in FIG. 4). The flow sensing valve 200 is further configured to move to the closed position to prevent fuel flow to the engine combustion chamber during a shutoff operation.

The position sensor 240 is operably coupled to the controller 304 and provides valve position feedback information thereto. Specifically, as the valve member 212 linearly translates between the open position and the closed position, the position sensor 240 determines the valve position and provides this valve position feedback information to the controller 304.

The controller 304 determines the metered flow rate (Wf) of pressurized fuel in the upstream manifold 112 based on the constant pressure drop across flow sensing valve 200 and the valve position feedback information from the position sensor 240, which is indicative of the open port area of the input and output ports 204-206. As such, the metered flow rate (Wf) of pressurized fuel in the upstream manifold 112 is proportional to the valve open port area. Therefore, the metered flow rate (Wf) of pressurized fuel to the engine combustion chamber in the upstream manifold 112 increases as the valve position changes to one of an increased open valve port area. On the other hand, the valve open port area diminishes as the valve member 212 moves from the open position toward the closed position, thereby resulting in a determination that the metered flow rate (Wf) of pressurized fuel in the upstream manifold 112 has decreased.

The controller 304 compares the metered fuel flow rate (Wf) of pressurized fuel in the upstream manifold 112 with the demanded or desired flow rate, and adjusts the operation of the variable flow source 401 accordingly (e.g., by controlling a position of the actuator control valve 406) such that the metered fuel flow rate (Wf) of pressurized fuel is equal to or approximately equal to the demanded or desired fuel flow rate. In this manner, the metered flow rate (Wf) of pressurized fuel to the engine combustion chamber is set by electronically controlling the operation of the variable flow source 401, rather than by using a selectively positioned fuel metering valve. In other words, the variable flow source 401 is configured to meter fuel flow to the engine combustion chamber directly through closed loop control using valve position feedback information from the flow sensing valve 200.

Figure 6:
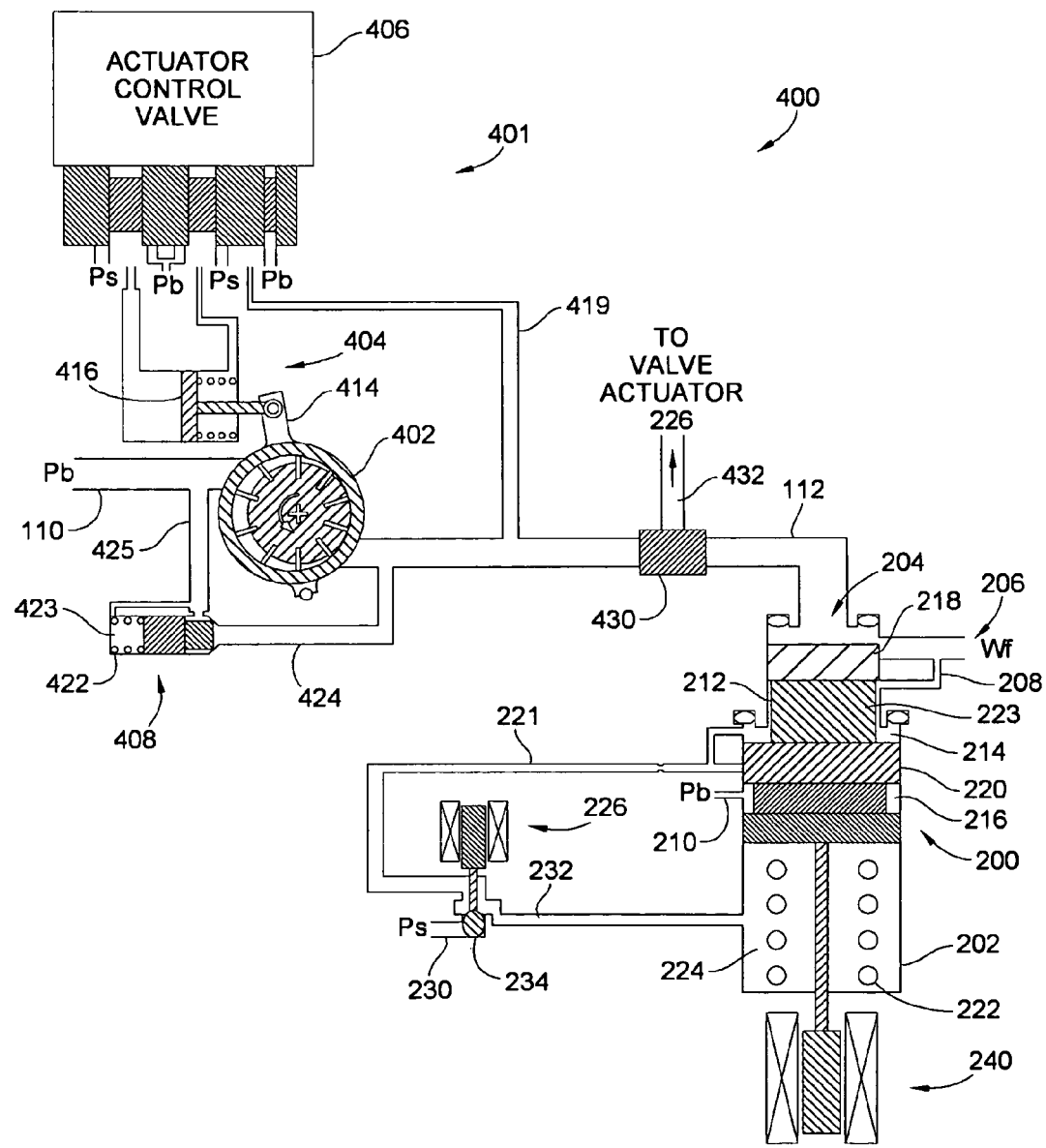
FIG. 6 is a schematic illustration of the fuel metering system that incorporates an embodiment of the invention.

FIG. 6 shows an embodiment of the fuel metering system 400 in which an actuation supply is shown in the upstream manifold 112. In this embodiment, system 400 includes a filter 430 such as, for example, a wash filter located in the upstream manifold 112 and configured to remove impurities in the flow of pressured fuel therein that would interfere with the smooth operation of the engine. The filter 430 is in fluid communication with an actuator supply path 432 that supplies the flow of pressurized fuel at pressure (Ps) to the actuator inlet 230 of the valve actuator 226. Pressurized fuel flows from the actuator inlet 230 through the actuator outlet 232 and to the spring chamber 224 when the actuator member 234 is in the open actuator position. On the other hand, the flow of pressurized fuel is blocked between the actuator inlet 230 and the actuator outlet 232 when the actuator member 234 is in the closed actuator position.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow sensing valve, comprising:
a valve housing including an inlet port, an outlet port, and a plurality of flow sensing ports, wherein the inlet port and the outlet port are in fluid communication with a flow of pressurized fuel in an upstream manifold;
a valve member located within the valve housing, wherein the valve member is configured to move between an open position and a closed position, wherein the valve member allows fuel flow between the inlet port and the outlet port in the open position, and wherein the valve member blocks fuel flow between the inlet port and the outlet port in the closed position; and
a position sensor operably coupled to the valve member and configured to determine a valve position of the flow sensing valve, wherein the valve position is indicative of a valve open port area, and wherein a metered flow rate of pressurized fuel through the flow sensing valve is proportional to the valve open port area.

2. The flow sensing valve of claim 1, wherein the flow sensing valve is configured to maintain a constant pressure differential across the inlet port and the outlet port.

3. The flow sensing valve of claim 1, wherein the valve housing defines a first valve chamber and a second valve chamber, and wherein the plurality of flow sensing ports comprises a first flow sensing port in fluid communication with the first valve chamber, and a second flow sensing port in fluid communication with the second valve chamber.

4. The flow sensing valve of claim 3, wherein the first flow sensing port is configured to communicate a pressure downstream of the outlet port to the first valve chamber and to a fuel feedback path when the valve member is in the open position, and wherein the second flow sensing port is configured to drain the flow of pressurized fuel from the second valve chamber when the valve member is in the open position.

5. The flow sensing valve of claim 1, wherein the valve member comprises a valve spool having a plurality of spool land portions configured to control fuel flow at the plurality of flow sensing ports.

6. The flow sensing valve of claim 5, wherein the plurality of spool land portions comprises a first spool land portion and a second spool land portion,
wherein the first spool land portion is configured to allow fuel flow between the inlet port and the outlet port when the valve member is in the open position, and to block fuel flow between the inlet port and the outlet port when the valve member is in the closed position, and
wherein the second spool land portion is configured to allow communication of a pressure downstream of the outlet port to the first valve chamber and to the fuel feedback path when the valve member is in the open position, and configured to block the flow of pressurized fuel between the first valve chamber and the fuel feedback path when the valve member is in the closed position.

7. The flow sensing valve of claim 1, further comprising:
a spring chamber defined by the valve housing; and
a spring element located within the spring chamber, wherein the spring chamber is configured to receive a flow of pressurized fuel from a fuel pump in the upstream manifold when the valve member is in the closed position, and wherein a spring force of the spring element and a flow force of the flow of pressurized fuel in the spring chamber are configured to urge the valve member toward the closed position.

8. The flow sensing valve of claim 1, wherein the position sensor comprises a linear variable displacement transducer (LVDT).

9. A fuel metering system, comprising:
a variable flow source configured to pressurize fuel from a supply manifold and to provide a flow of pressurized fuel to an upstream manifold;
a flow sensing valve operably coupled to the variable flow source and located in the upstream manifold, wherein the flow sensing valve comprises:
a valve housing having an inlet port, an outlet port, and a plurality of flow sensing ports;
a valve member located within the valve housing, wherein the valve member is configured to move between an open position and a closed position, wherein the valve member allows fuel flow between the inlet port and the outlet port in the open position, and wherein the valve member blocks fuel flow between the inlet port and the outlet port in the closed position;
a position sensor operably coupled to the valve member and configured to determine a valve position of the flow sensing valve, wherein the valve position is indicative of a valve open port area of the flow sensing valve; and
a controller operably coupled to the variable flow source and the position sensor, wherein the controller is configured to determine a metered flow rate of pressurized fuel through the flow sensing valve based on the valve position, and wherein the controller is further configured to operate the variable flow source based on the metered flow rate.

10. The fuel metering system of claim 9, wherein the metered flow rate is proportional to the valve open port area.

11. The fuel metering system of claim 9, wherein the plurality of flow sensing ports comprises a first flow sensing port and a second flow sensing port, wherein the first flow sensing port is in fluid communication with a first valve chamber, and wherein the second flow sensing port is in fluid communication with a second valve chamber.

12. The fuel metering system of claim 11, wherein the first flow sensing port is configured to communicate a pressure downstream of the outlet port to the first valve chamber and to a fuel feedback path when the valve member is in the open position, and wherein the second flow sensing port is configured to drain the flow of pressurized fuel from the second valve chamber when the valve member is in the open position.

13. The fuel metering system of claim 9, wherein the valve member comprises a valve spool having a plurality of spool land portions configured to control fuel flow at the plurality of flow sensing ports.

14. The fuel metering system of claim 13, wherein the plurality of spool land portions comprises a first spool land portion and a second spool land portion,
wherein the first spool land portion is configured to allow fuel flow between the inlet port and the outlet port when the valve member is in the open position, and to block fuel flow between the inlet port and the outlet port when the valve member is in the closed position, and
wherein the second spool land portion is configured to allow communication of a pressure downstream of the outlet port to the first valve chamber and to the fuel feedback path when the valve member is in the open position, and configured to block the flow of pressurized fuel between the first valve chamber and the fuel feedback path when the valve member is in the closed position.

15. The fuel metering system of claim 9, wherein the flow sensing valve comprises a spring element located within a spring chamber of the valve housing, and wherein the spring chamber is configured to receive the flow of pressurized fuel from the upstream manifold when the valve member is in the closed position.

16. The fuel metering system of claim 15, wherein a spring force of the spring element and a flow force of the flow of pressurized fuel in the spring chamber are configured to move the valve member toward the closed position when a valve actuator is in an open actuator position.

17. The fuel metering system of claim 9, further comprising a valve actuator operably coupled to the flow sensing valve, wherein the valve actuator is configured to control movement of the valve member between the open position and the closed position.

18. The fuel metering system of claim 17, wherein the valve actuator comprises:
  an actuator inlet in fluid communication with the flow of pressurized fuel from the upstream manifold;
  an actuator outlet in fluid communication with the spring chamber of the flow sensing valve; and
  an actuator member configured to move between an open actuator position and a closed actuator position, and configured to allow the flow of pressurized fuel from the actuator inlet through the actuator outlet and to the spring chamber when the actuator member is in the open actuator position, and wherein the actuator member is configured to block the flow of pressurized fuel between the actuator inlet and the actuator outlet when the valve actuator is in the closed actuator position.

19. The fuel metering system of claim 17, wherein the valve actuator comprises a solenoid valve or an electro-hydraulic servo valve.

20. The fuel metering system of claim 9, wherein the position sensor comprises a linear variable displacement transducer (LVDT).

21. The fuel metering system of claim 9, wherein the variable flow source comprises a fuel pump.

22. The fuel metering system of claim 21, further comprising a relief valve operably coupled to the fuel pump, wherein the relief valve is configured to divert a portion of the flow of pressurized fuel from the upstream manifold to a bypass return path when a pressure at an output of the fuel pump is greater than a predetermined threshold.

23. The fuel metering system of claim 21, wherein the variable flow source comprises:
  a pump actuator operably coupled to the fuel pump and configured to control pump displacement; and
  an actuator control valve operably coupled to the pump actuator and the controller, wherein the controller and the actuator control valve are configured to control the pump actuator based on the metered flow rate.

24. The fuel metering system of claim 23, wherein the actuator control valve comprises an electro-hydraulic servo valve (EHSV).

* * * * *